United States Patent [19]

Reddaway

[11] Patent Number: 4,628,481
[45] Date of Patent: Dec. 9, 1986

[54] DATA PROCESSING APPARATUS

[75] Inventor: Stewart F. Reddaway, Baldock, Great Britain

[73] Assignee: International Computers Limited, London, England

[21] Appl. No.: 678,688

[22] Filed: Dec. 6, 1984

[30] Foreign Application Priority Data

Jan. 24, 1984 [GB] United Kingdom ............... 8401805

[51] Int. Cl.⁴ .............................................. G06F 13/38
[52] U.S. Cl. ...................................... 364/900; 382/47
[58] Field of Search ... 364/200 MS File, 900 MS File; 358/212, 213; 382/47; 340/750, 744, 801

[56] References Cited

U.S. PATENT DOCUMENTS 3,815,095 6/1974 Wester .............................. 340/172.5
4,174,514 11/1979 Sternberg .................. 340/146.3 MA
4,472,732 9/1984 Bennett et al. ......................... 358/22

Primary Examiner—James D. Thomas
Assistant Examiner—Michael J. Ure
Attorney, Agent, or Firm—Lee, Smith & Zickert

[57] ABSTRACT

Data processing apparatus is described, comprising an array of data processing elements in rows and columns. Each element has a data register for input/output. Each column of data registers can be interconnected to form a serial shift path containing either (a) the even-numbered registers, (b) the odd-numbered registers or (c) all the registers. This allows data to be shifted out of the array, one row at a time, either from the even rows, the odd rows, or all the rows. Data can be shifted into the array in a similar way. The facility for selecting the even or odd rows is useful for handling interlaced image data.

6 Claims, 2 Drawing Figures

DATA PROCESSING APPARATUS

This invention relates to data processing apparatus of the kind comprising a plurality of data processing elements logically arranged in rows and columns to form an array. Each processing element may be connected to the neighbouring elements in the array to allow exchange of information between them.

This kind of processing apparatus is sometimes referred to as an array processor, and is described, for example, in British Pat. Nos. 1,445,714 and 1,536,933. An advantage of such apparatus is that, if the number of processing elements is large, many operations can be performed simultaneously and hence the overall data processing rate can be very high.

One use for such apparatus is in processing digitally encoded image information, e.g. for enhancing images, or extracting features from the images to assist in pattern recognition. For this purpose, each processing element may be assigned to one or more particular picture elements (pixels) of the image, and arranged to process variables (such as intensity) associated with those pixels.

When it is desired to display the processed image, the image data must be read out from all the processing elements in the correct order to form a video signal for a visual display unit. The reading out of the image data is complicated by the fact that the display unit may be of the interlaced type, in which all the odd and all the even lines of the image are displayed alternately. Similar problems arise when inputting data from an interlaced source.

The object of the invention is to facilitate the reading out of data from the processing elements for feeding an interlaced display, or the input of data from an interlaced source.

SUMMARY OF THE INVENTION

According to the invention there is provided data processing apparatus comprising a plurality of data processing elements each of which has an associated data register for receiving output data from that element, the data processing elements and their associated data registers being logically arranged in rows and columns, wherein each column of the data registers includes interconnection means selectively operable to connect together either (a) the even-numbered registers in that column, (b) the odd-numbered registers in that column, or (c) all the registers in that column, thereby forming a serial shift path in each column allowing data either from the even rows, the odd rows, or all the rows to be shifted out, one row at a time.

The data registers may also be used for input to the processing elements.

One data processing apparatus in accordance with the invention will now be described by way of example with reference to the accompanying drawings.

DESCRIPTION OF THE EMBODIMENT OF THE INVENTION

Figure 1:
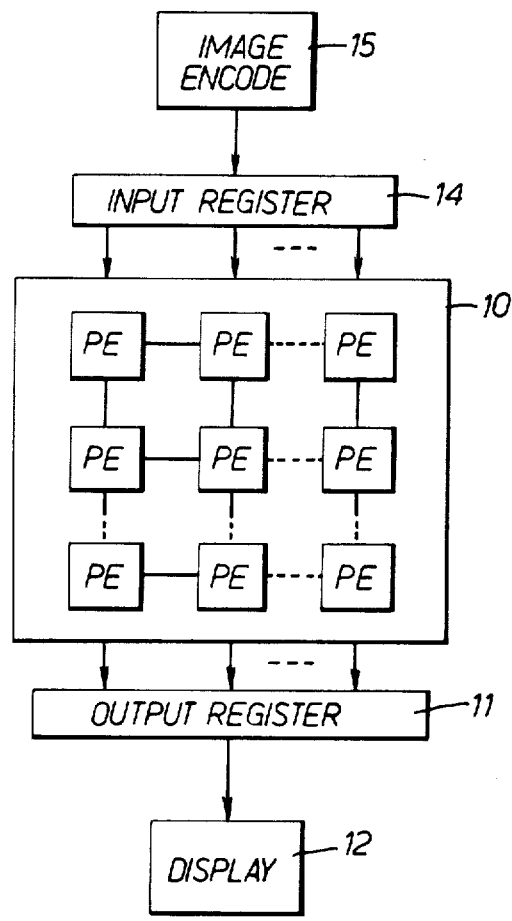
FIG. 1 is a block diagram of the data processing apparatus, consisting of an array of processing elements.

Referring to FIG. 1, the processing apparatus comprises a two-dimensional array 10 of processing elements PE, arranged in rows and columns to form a square or rectangular array. For example, there may be 1024 elements in the array, arranged in 32 rows and 32 columns. Each element is connected to its four nearest neighbours in the array, in the north, east, south and west directions, to permit transfer of data between them. The exception to this is at the edges of the array where the elements have fewer than four neighbours; in this case, the elements along each edge may be connected to those along the opposite edge.

It should be noted that the arrangement of processing elements in rows and columns refers to the logical arrangement of the elements, and does not necessarily correspond to their physical arrangement.

Physically, the array is constructed from large-scale integrated circuit chips, each of which contains sixteen processing elements, forming a 4×4 sub-array. Sixty-four such chips, connected in an 8×8 configuration, are required to form the 32×32 array of processing elements.

Each of the processing elements may be of the form shown in the published patent specifications referred to above, and so it is not necessary to describe them in detail herein.

Data can be read out of the array, as will be described, and placed in an output register 11. This data may then, after further processing if necessary, be used to provide a video signal for driving an interlaced visual display unit 12.

Data can also be input to the array, by way of an input register 14. This data may consist of digitally encoded image data derived from an image encoding device 15.

Figure 2:
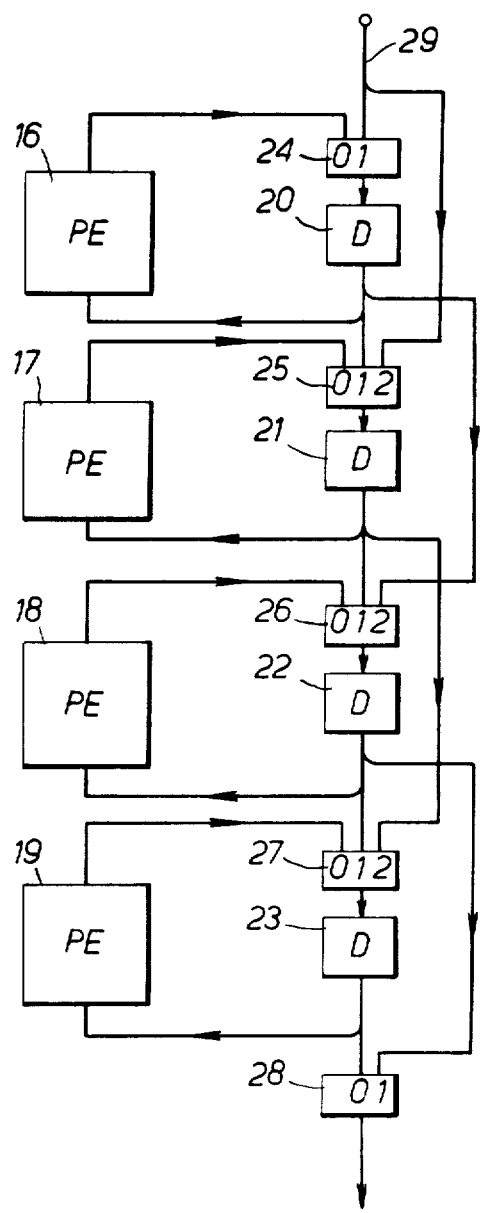
FIG. 2 shows data registers for input and output of data to and from a part of the array.

Referring to FIG. 2, this shows four processing elements 16–19 forming one column of the 4×4 sub-array in one of the chips. The four elements 16–19 have respective single-bit data registers 20–23 associated with them, for input and output of data. The registers 20–23 are connected to five multiplexers 24–28.

Multiplexer 24 is a two-way multiplexer, having inputs 0 and 1. Input 0 is connected to the output of processing element 16, and input 1 is connected by way of a path 29 to the output of the multiplexer 28 in the preceding chip. (In the case of a chip at the top edge of the array, this input is connected to the input register 14). The output of the multiplexer 24 is connected to the input of register 20.

Multiplexers 25–27 are all three-way multiplexers, with inputs 0,1 and 2. In each case, input 0 is connected to the output of the corresponding processing element 17,18 or 19. Input 1 is connected to the preceding register 20,21 or 22, while input 2 is connected so as to by-pass that register. The outputs of the multiplexers 25–27 are connected to the registers 21,22 and 23.

Multiplexer 28 is a two-way multiplexer with inputs 0 and 1. Input 0 is connected to the output of register 23, while input 1 is connected so as to by-pass that register. The output of multiplexer 28 is connected to input 1 of the multiplexer 24 in the next chip. (In the case of a chip at the bottom edge of the array, this output is connected to the output register 11).

When it is desired to output data from the array, each multiplexer 24–27 is first set to select input 0. This allows each processing element to write data into its associated register. It can be seen that the totality of registers thus holds a complete plane of output data from the processing elements.

The data is then shifted out of the registers into the output register 11. This can be done in three different modes.

In the first mode, the multiplexers 24–27 are switched to select input 1 and the multiplexer 28 is switched to select input 0. The effect of this is to connect in series all the registers in each column of the array, to form a serial shift register. This allows the whole plane of data to be shifted into the output register 11, one row at a time.

In the second mode, multiplexers 25 and 27 are switched to select input 2, and multiplexer 28 is switched to select input 0 (the states of the other multiplexers being immaterial). The effect of this is to connect in series all the odd-numbered registers (21,23) in each column of the array, by-passing the even-numbered registers.

In the third mode, multiplexers 24 and 28 are switched to select input 1 and multiplexer 26 is switched to select input 2 (the states of the other multiplexers being immaterial). The effect of this is to connect in series all the even-numbered registers (20,22) in each column, by-passing the odd-numbered registers.

The second and third modes are particularly useful for outputting image data to the interlaced visual display unit 12. In this case, the registers 20–23 are loaded with the processed image data from the processing elements. The odd rows are then shifted out, one at a time, to provide the odd lines of the display. The registers are loaded again with the same data and then the even rows are shifted out, to provide the even lines of the display.

Data can be written into the processing elements using the registers 20–23 in a similar manner. In this case, if the input data represents an interlaced image, then the second and third modes will again be used to load first the odd rows and then the even rows.

It should be noted that the two-input multiplexer 28, and the two-input multiplexer 24 on the next chip, together form a multiplexing circuit which performs the same function as one of the three-input multiplexers 25,26,27.

Thus, it can be seen that each adjacent pair of data registers in the same column are interconnected by a multiplexing circuit. Where the adjacent registers both lie in the same chip, the multiplexing circuit comprises a single three-input multiplexer 25,26 or 27. On the other hand, where the two adjacent data registers lie on different chips, the multiplexing circuit which connects them comprises two separate two-input multiplexers 28,24, which lie on the respective chips. This arrangement ensures that only a single path 29 is required between the two chips to complete the shift path in that column. If the pair of multiplexers 28,24 were replaced by a single three-input multiplexer connected in a similar way to the multiplexers 25,26,27 this would have required two paths between the chips instead of one.

I claim:

1. Data processing apparatus comprising a plurality of data processing elements each of which has an associated data rgister for receiving output data from that element, each data register having an associated multiplexing circuit connected to a data input of the data register, the data processing elements and their associated data registers being logically arranged in rows and columns, wherein each column of the data registers includes:

(a) a first set of connection paths each of which connects a data output of a respective one of the data registers to a first input of the multiplexing circuit associated with the next data register in the same column, and (b) a second set of connection paths, distinct from the first set of connection paths, each of the second set of connection paths connecting the data output of a respective one of the data registers to a second input of the multiplexing circuit associated with the next-but-one data register in the same column, whereby the multiplexing circuits are selectively operable to connect together either (i) the even-numbered registers in each column,
  (ii) the odd-numbered registers in each column, or
  (iii) all the registsers in each column, thereby forming a serial shift path in each column allowing data either from the even rows, the odd rows, or all the rows to be shifted out, one row at a time.

2. Data processing apparatus according to claim 1 wherein the apparatus comprises a plurality of integrated circuit chips each of which contains a plurality of the processing elements forming a portion of at least one column of processing elements, together with their associated data registers and multiplexing circuits 3. Data processing apparatus according to claim 2 wherein, wherever two adjacent data registers in the same column lie on the same integrated circuit chip, the multiplexing circuit which interconnects them lies wholly on that same chip, and wherever two adjacent data registers in the same column lie on different integrated circuit chips, the multiplexing circuit which interconnects them comprises two separate multiplexers which lie on the respective chips, these two multiplexers being interconnected by means of a single path between the chips.

4. Data processing apparatus according to claim 1 wherein the multiplexing circuits are also operable to connect the outputs of the processing elements to their associated data registers.

5. Data processing apparatus according to claim 1, wherein the outputs of the serial shift paths formed by the data registers and the interconnection means are connected to an interlaced visual display unit.

6. Data processing apparatus according to claim 1, wherein the inputs of the serial shift paths formed by the data registers and the interconnection means are connected to the output of an image encoding device.

* * * * *